United States Patent Office 3,250,978
Patented May 10, 1966

3,250,978
CONTROLLED SWITCHING CIRCUIT FOR D.C. SUPPLY FOR INDUCTIVE OR REGENERATIVE LOADS
Michael Henry Moscardi, Stafford, England, assignor to The English Electric Company Limited, London, England, a British company
Filed June 24, 1963, Ser. No. 289,812
Claims priority, application Great Britain, July 3, 1962, 25,516/62
12 Claims. (Cl. 318—345)

This invention relates to an electric circuit arrangement for controlling the flow of current between a direct current supply source and an inductive or regenerative direct current load circuit.

According to the invention such an electric circuit arrangement comprises in combination a switching circuit having positive and negative terminals for connection to the supply source and including in series between the terminals first and second controllable electronic switching devices and a tapped linear inductor, the inductor being connected between the switching devices and the switching devices being connected so as to enable current to flow towards the negative terminal, capacitative means connected with the inductor tapping for preventing the potential of the tapping changing at a rate greater than a predetermined value, a diode circuit connected in parallel with the switching circuit and including in series two diodes connected so as to enable current to flow towards the positive terminal, means for electrically connecting together the tapping of the inductor and a common connection connecting the two diodes, output circuit connections for enabling the load circuit to be connected between the tapping of the inductor and one of the terminals of the switching circuit, and control means for rendering the switching devices repeatedly and alternately conductive at instants in each cycle of operation which are dependent on a control signal to be supplied to the control means whereby to control the said flow of current between the supply source and the load circuit.

Preferably, the capacitative means comprises a capacitor circuit connected in parallel with the switching circuit and including in series two capacitors, a common connection between the capacitors being electrically connected with the inductor tapping.

According to a feature of the invention an electric circuit arrangement for controlling the flow of current between a direct current supply source and a direct current load circuit which has a relatively low inductance, includes in the said output circuit connections an inductor having a desired relatively high inductance for raising to a predetermined value the total inductance of the output circuit connections and direct current load circuit.

Preferably, each inductor tapping is a centre tapping on the inductor, the two capacitors in each capacitor circuit have the same electrical characteristics, and the two diodes in each diode circuit have the same electrical characteristics.

Figure 1:
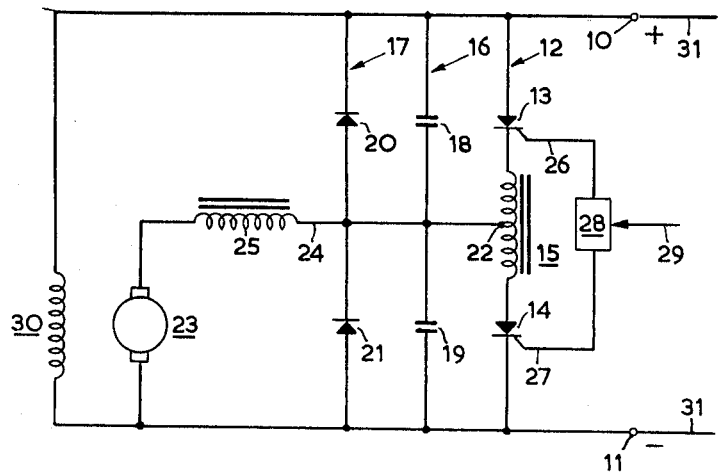
Figure 3:
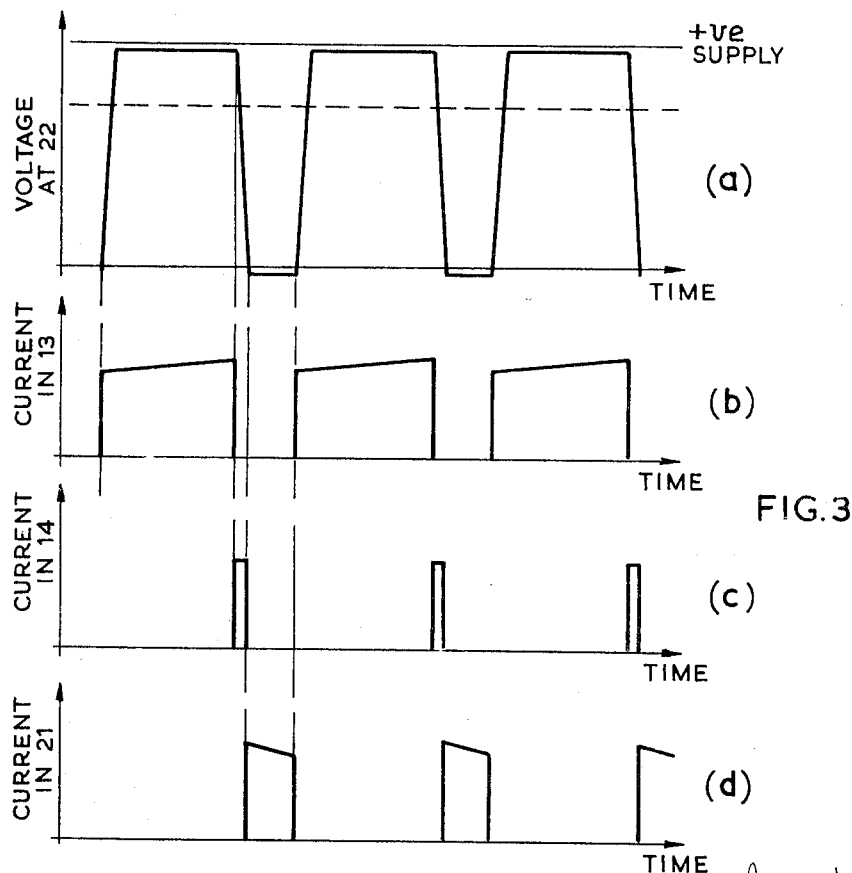
Figure 2:
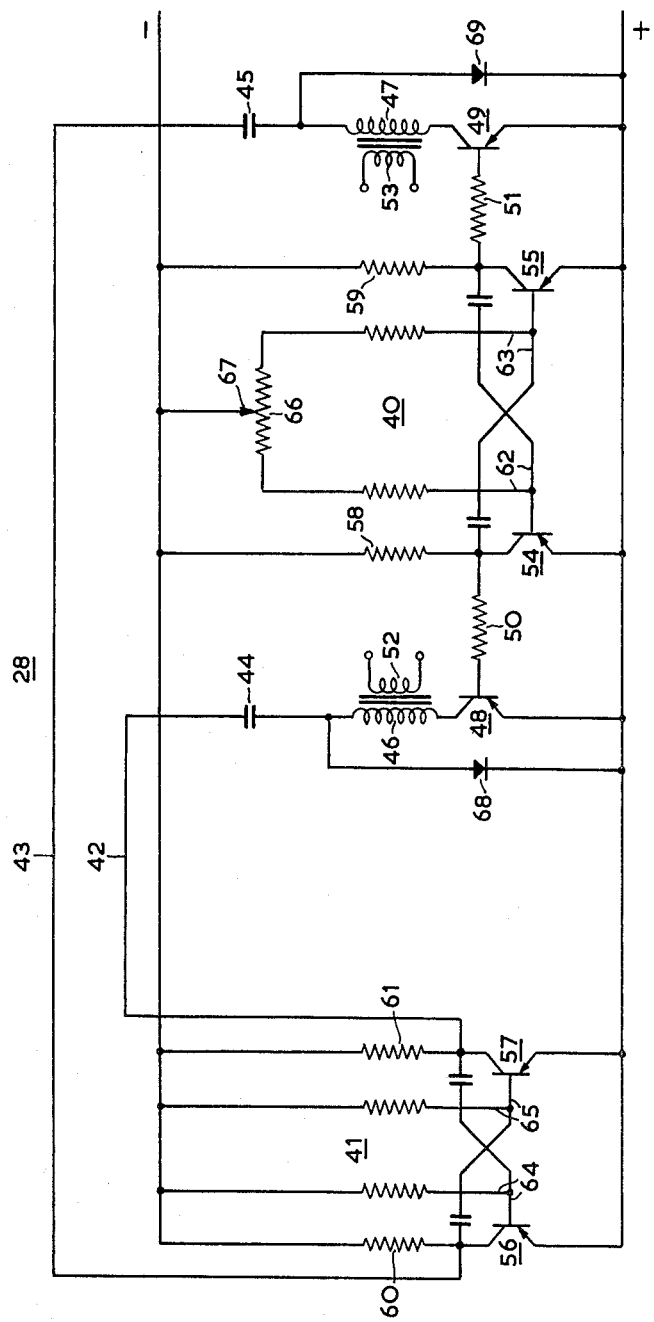
Figure 4:
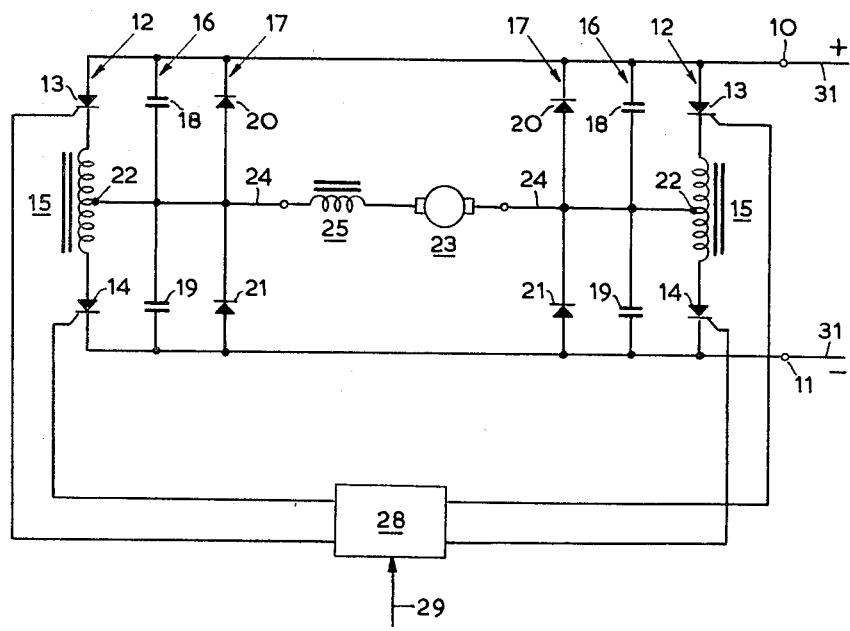
Figure 5:
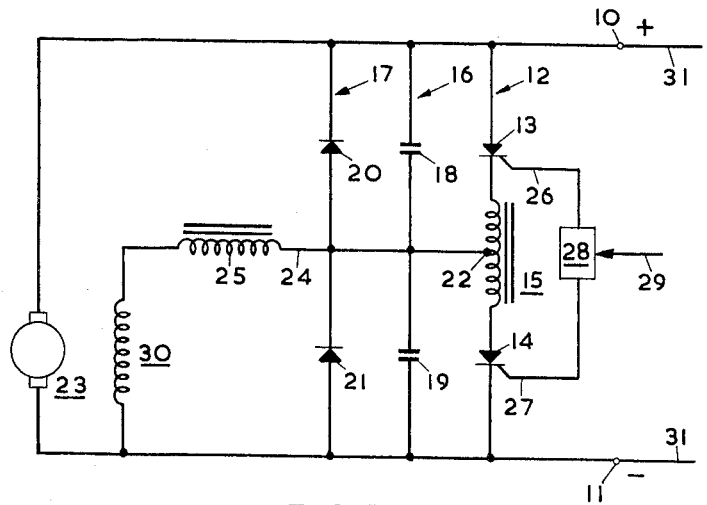
Figure 6:
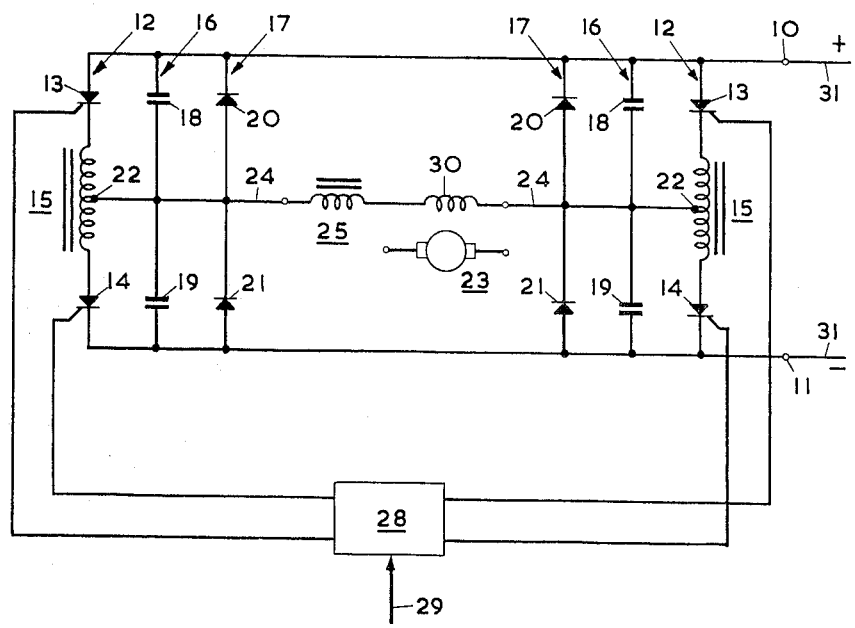

Two electric circuit arrangements according to the present invention for controlling the flow of current between a direct current supply source and a direct current electric motor will now be described by way of example and with reference to the accompanying drawings. In the drawings FIG. 1 shows diagrammatically the principal electric circuit connections of the first circuit arrangement, whilst FIG. 2 shows diagrammatically the electric circuit connections of a control means incorporated in the circuit arrangement shown in FIG. 1. FIG. 3 shows graphically the manner in which the current and voltage at points in the circuit arrangement of FIG. 1 vary with time, and FIG. 4 shows diagrammatically the principal electric circuit connections of the second electric circuit arrangement. FIGURES 5 and 6 show the circuit arrangements of the FIGS. 1 and 4 respectively supplying motor field winding circuits instead of the motor armature circuits.

Referring now to FIG. 1 the first electric circuit arrangement includes between a pair of input terminals 10 and 11 a switching circuit 12 which includes in series two silicon controlled rectifiers (pylistors) 13, 14 and a centre-tapped linear inductor 15, the inductor being connected between the two rectifiers, and the rectifiers being connected so as to enable current to flow through them towards the negative terminal.

Connected in parallel with the switching circuit are a capacitor circuit 16 and a diode curcuit 17. The capacitor circuit includes two electrically similar capacitors 18, 19 connected in series with one another, whilst the diode circuit includes two electrically similar diodes 20, 21 connected in series with one another. The centre tapping 22 of the inductor 15 is electrically connected to the common connection between the two capacitors and to the common connection between the two diodes.

An armature circuit 23 of a direct current electric motor to be controlled by this first circuit arrangement is connected between the centre tapping 22 of the inductor 15 and the negative terminal 11 by output circuit connections 24 which include in series a linear inductor 25. This inductor is arranged to have such a value of inductance that the total inductance of the load circuit (that is the motor armature circuit) and the said output circuit connections is of a sufficiently high value to achieve the manner of operation of the circuit to be described later.

The silicon controlled rectifiers 13, 14 have gate electrodes 26, 27 which are supplied alternately with gating pulses by a pulse generating means 28, which is arranged to vary in dependence upon a control signal 29 supplied to it the relative instants in each cycle of operation of the circuit arrangement at which the gating pulses are produced.

A field circuit 30 of the motor 24 is connected to the terminals 10 and 11 for energisation whenever these terminals are connected with a D.C. supply source.

Assuming the terminals 10, 11 to be connected to a suitable D.C. supply source 31 the circuit arrangement functions in the following manner to control the flow of current between the supply source and armature circuit 23.

When the motor is operating as a motor driving a load coupled to it, current flows from the supply source to the armature circuit, the motor back E.M.F. being less than the average potential of the centre tapping 22 of the inductor 15.

In operation, when the upper rectifier 13 has been rendered conductive by the application of a gating pulse to its gate electrode, current flows from the supply source to the armature circuit through this rectifier. Due to the very low resistance of the inductor 15 the potential of the centre tapping 22 rises during this period to a potential very nearly equal to that of the positive terminal 10, and the capacitor 19 becomes charged up to this potential, whilst the capacitor 18 is discharged to a very low potential.

Thus when the lower rectifier 14 is subsequently rendered conductive by the application of a gating pulse to its gate electrode, the lower half of the inductor 15 has developed across it a voltage substantially equal to the supply voltage. The consequent flow of current induces by auto-transformer action an equal potential in the upper half of the inductor, with the result that the cathode of the rectifier 13 is raised to a potential greater than that of its anode and conduction of current through the rectifier 13 consequently ceases.

However, due to the combined high inductance of the inductor 25 and the armature circuit 23 the current flow in these circuit components tends to be maintained, and a continued current flow is made possible by reason of there being a conductive path through the diode 21.

During this period of operation the lower capacitor 19 discharges to a very low potential, the potential of the centre tapping 22 falling to a value just greater than that of the negative terminal 11, whilst the upper capacitor 18 becomes charged to a potential substantially equal to that of the positive terminal 10.

When a gating pulse is subsequently applied to the gate of the upper rectifier 13 to render it once more conductive the anode of the lower rectifier 14, by dint of transformer action in the inductor 15, is carried to a potential well below that of its cathode. However, this is of no effect since this rectifier is not at that time conducting. The armature current is now again derived from the supply source through the upper rectifier 13.

By varying the instants in each cycle of operation of the circuit arrangement at which the lower rectifier 14 is rendered conductive the period in each cycle during which power is supplied to the armature circuit may be varied, the power supplied to the armature circuit being reduced as these instants are advanced towards the instants at which the upper rectifier 13 is rendered conductive.

Should the load coupled with the motor tend to drive the motor then the armature back E.M.F. will rise above the average potential of the centre tapping 22 of the inductor, and regenerative power will be passed back automatically to the supply source 31, in the manner now to be described.

When under these circumstances the lower rectifier 14 has been rendered conductive, the armature circuit E.M.F. drives a current around a circuit which includes the lower half of the inductor 15 and the lower rectifier 14. The potential of the centre tapping 22 falls during this period of operation to a low value just greater than that of the negative terminal 11, the lower capacitor 19 being discharged to this low value, and the upper capacitor being charged to a potential substantially equal to that of the positive terminal 10.

If now a gating pulse is applied to the gate electrode of the upper rectifier 13 a potential substantially equal to the supply potential is developed across the upper half of the inductor 15, and the resulting flow of current induces by auto-transformer action an equal potential in the lower half of the inductor. The anode of the lower rectifier is thus carired to a potential below that of its cathode so that this rectifier is rendered non-conductive, and the flow of armature circuit current tends to be disrupted.

However, the combined inductance of the armature circuit 23 and inductor 25, in tending to maintain the former flow of current, causes the induction of an E.M.F. in those parts of the circuit such that the potential of the anode of the upper diode 20 is raised above that of the cathode, and current consequently flows through this diode to the supply source against the potential of the supply source. The rectifier 13 is rendered non-conductive by this condition since its cathode potential is now above its anode potential.

This condition continues until a gating pulse is subsequently applied to the gating electrode of the lower rectifier 14, whereupon the rectifier 14 once again becomes conductive and current flows in the lower half of the inductor.

With the consequent discharge of the capacitor 19 the potential of the anode of the upper diode 20 falls below that of the cathode so that conduction through this diode, and regeneration, ceases.

The magnitude of the power regenerated depends on the duration of the interval in each cycle of operation during which current flows through the upper diode 20, so that as in the case of motoring operation the power transmitted between the motor armature circuit and the supply source depends upon the instant in each cycle of operation at which the lower rectifier 14 is rendered conductive. The regenerated power decreases as the instants at which the lower rectifier 14 is rendered conductive are advanced towards those instants at which the upper rectifier 13 is rendered conductive.

It will be appreciated that the circuit arrangement just described above will not only supply power to the motor to cause it to drive its associated load, but will also enable power to be passed back into the supply source automatically whenever the load associated with the motor tends to over-drive the motor. No circuit changes or modifications are necessary to enable the motor to change from the motoring condition of operation to the regenerative braking condition of operation, and braking can be obtained at all speeds within the working range of motor speeds.

The average voltage applied to the armature circuit 23 would have a maximum value when the upper rectifier 13 is maintained continuously conducting and the lower rectifier continuously non-conducting. On the other hand the applied voltage would be of zero value if both rectifiers 13 and 14 are maintained continuously non-conducting, though in this latter condition no electrical braking of the motor is possible. In order to overcome this disadvantage it can be arranged that instead the lower rectifier 14 is repeatedly rendered conductive whereby to enable a braking current to flow in the armature circuit.

In practice the above limiting conditions of applied voltage are difficult to obtain, though with the control means 28 as shown in FIG. 2 the applied voltage may be varied continuously between the limits of approximately 5 and 95% of the supply source voltage.

FIG. 3 shows wave forms which are typical of those obtained under motoring conditions of operation when the average voltage applied to the motor armature circuit lies somewhere between the two practical limiting values. FIG. 3(a) shows by a full line the wave form of the voltage applied to the motor armature circuit and by the dotted line the mean value of this applied voltage. FIGS. 3(b) and 3(c) show respectively the substantially rectangular wave forms of the currents which flow in the upper and lower rectifiers 13 and 14, whilst FIG. 3(d) shows the substantially rectangular wave form of the current which flows in the lower diode 21.

The control means 28 may comprise an apparatus as shown in FIG. 2. This control apparatus consists essentially of two multivibrator oscillators 40, 41 arranged to oscillate at substantially different frequencies, the higher frequency oscillator 41 providing at its output circuits 42, 43 rectangular output voltage pulses for application through coupling capacitors 44, 45 and output transformer primary windings 46, 47 to the collector circuits of two output transistors 48, 49 and the low frequency oscillator 40 providing through resistors 50 and 51 rectangular base control voltage pulses for the bases of the two output transistors 48, 49.

Output pulses for controlling the rectifiers 13 and 14 of FIG. 1 are derived from secondary windings 52, 53 of the output transformers.

Each oscillator includes two p-n-p type transistors 54–57 having appropriate collector circuit resistors 58–61 and cross-connected R-C base control circuits 62–65. The lower frequency oscillator 40 has in its base control circuits 62, 63 a common resistor 66 and an adjustable tapping on this resistor 67 through which these base control circuits are connected with the negative terminal of the supply source. Adjustment of this tapping varies the time constants of the two base control circuits 62, 63 in opposite senses, and hence varies in opposite senses the respective periods of time in each cycle of the oscillator during which each of the transistors 54, 55 is conducting and non-conducting respectively.

Diodes 68 and 69 are connected in parallel with the output transformer primary windings and output transistors to provide a by-pass for current pulses which flow each time the potentials of the higher frequency oscillator output circuits 42, 43 rise.

In operation, whenever the base of an output transistor 48, 49 is driven in a negative sense relative to the emitter, a pulse of current flows in the primary winding of the associated output transformer each time the voltage applied to the collector circuit by the associated output circuit 42, 43 of the higher frequency oscillator 41 falls to a low negative value, with the result that several pulses of current flow in each output transformer secondary winding each time the associated output transistor is rendered conductive by a negative base signal.

It will be appreciated that since the potentials supplied to the bases of the two output transistors 48, 49 are always of opposite senses, output pulses will be produced by only one of the output transformer secondary windings 52, 53 at any one time.

The period of each cycle of operation of the lower frequency oscillator 40 during which the base of each output transistor is held negative is dependent on the setting of the adjustable tapping 67 on the resistor 66.

Whereas in FIG. 1 the electric circuit arrangement is employed to vary the power flow to and from the motor armature circuit 23, such a circuit arrangement can also be used for controlling the flow of power to and from any inductive direct current load circuit, and in cases where the inductance of the load circuit is in itself not high enough to ensure operation of the circuit arrangement in the above described manner, the necessary extra inductance can be provided in the form of a linear inductor such as 25 in FIG. 1.

The electric circuit arrangement of FIG. 1 is also particularly useful for controlling direct current field excitation systems of dynamo electric machines, since rapid variations in the field excitation system can be readily made. FIGURE 5 shows the circuit arrangement of FIG. 1 supplying direct current to the field winding circuit 30 of the motor instead of the motor armature circuit. In many instances it may be found that the inductance of such a field excitation system will in itself be sufficient to enable the desired operation to be obtained without the need for a linear inductor such as 25 in FIG. 1.

Whereas in FIG. 1 the output connections 24 connect the armature circuit 23 between the centre tapping 22 of the inductor 15 and the negative terminal 11, they may if desired be arranged to connect the armature circuit between the tapping 22 and the positive terminal 10 instead.

Furthermore, the tapping 22 of the inductor 15 may if desired be arranged at other positions on the inductor provided that appropriate modifications are made in the capacitance values of the capacitors 18 and 19.

The second electric circuit arrangement shown in FIG. 4 consists of two similar electric circuit arrangements, each of which is similar to that shown in FIG. 1. Like parts which appear in both FIGS. 1 and 4 have therefore been referenced in like manner in both of these figures.

The controlled rectifiers 13, 14 of the left hand circuit arrangement of FIG. 4 are arranged to be controlled in a manner opposite to that in which the rectifiers 13 and 14 of the right hand circuit arrangements, so that as the input control signal 29 applied to the control means 28 is varied the mean potentials of the two inductor tappings 22 vary in opposite senses. The flow of current between these tappings through the load circuit is therefore reversible. Hence the motor whose armature circuit constitutes the load circuit may be operative in both senses of rotation and in both the motoring and electrical braking modes.

The gating pulses for both sets of rectifiers 13, 14 are derived from a control apparatus 28 similar to that shown in FIG. 1 but having separate secondary windings on the output transformers for supplying the individual gating electrode circuits of the rectifiers.

The capacitor circuits 16 in the arrangements described above may be replaced by any other capacitor circuit arrangements which are likewise arranged to prevent the potential of each inductor tapping changing at a rate greater than a desired predetermined value. For example where the impedance of the supply source 31 is small, a single capacitor connected between the inductor tapping 22 and one of the terminals 10 and 11 will suffice.

Though in the above described circuit arrangements the silicon controlled rectifier (pylistor) has been used as a controllable electronic switching device, any equivalent form of switching device may be used in its stead, that is any controllable electronic switching device in which current conduction once initiated can be terminated only by inverting the anode-cathode potential, e.g., a thyratron.

The electric circuit arrangement of FIG. 4 is also particularly useful for controlling direct current field excitation systems of dynamo-electric machines, since rapid variations in the field excitation can be readily made. FIGURE 6 shows the circuit arrangement of FIG. 4 supplying direct current to the field winding circuit 30 of the motor instead of to the armature winding circuit 23.

What I claim as my invention and desire to secure by Letters Patent is:

1. An electric circuit arrangement for controlling the flow of current between a direct current supply source and an inductive direct current load circuit, the arrangement comprising in combination a switching circuit having positive and negative terminals for connection to the supply source and including in series between the terminals, first and second controllable electronic switching devices and a tapped linear inductor, the inductor being connected between the switching devices and the switching devices being connected so as to enable current to flow towards the negative terminal, a capacitor circuit connected in parallel with the switching circuit for preventing the potential of the tapping changing at a rate greater than a predetermined value and including in series two capacitors connected together by a common connection, a diode circuit connected in parallel with the switching circuit and including in series two diodes connected together by a common connection and in a manner so as to enable current to flow towards the positive terminal, means for electrically connecting together the tapping of the inductor and the said common connections connecting the diodes and the capacitors, output circuit connections for enabling the load circuit to be connected between the tapping of the inductor and one of the terminals of the switching circuit, and control means for rendering the switching devices repeatedly and alternately conductive at instants in each cycle of operation which are dependent on a control signal to be supplied to the control means whereby to control the said flow of direct current between the supply source and the load circuit.

2. An electric circuit arrangement according to claim 1, wherein the inductor tapping is a centre tapping on the inductor, the two capacitors in each capacitor circuit have the same electrical characteristics, and the two diodes in each diode circuit have the same electrical characteristics.

3. An electric control system for a direct current electric motor including an electric circuit arrangement according to claim 2 for controlling the flow of current between a direct current supply source and a field circuit of the electric motor, the motor field circuit constituting the aforesaid direct current load circuit.

4. An electric circuit arrangement according to claim 2, for controlling the flow of current between a direct current supply source and a direct current load circuit which has a relatively low inductance, including in the said output circuit connections an inductor having a desired relatively high inductance for raising to a predetermined value the total inductance of the output circuit connections and direct current load circuit.

5. An electric control system for a direct current electric motor including an electric circuit arrangement according to claim 4 for controlling the flow of current between a direct current supply source and an armature circuit of the motor, the motor armature circuit constituting the aforesaid direct current load circuit.

6. An electric circuit arrangement according to claim 1 wherein the controllable electronic switching devices comprise silicon controlled rectifier devices, and each control means comprises a pulse generating means.

7. An electric circuit arrangement according to claim 1, including a second switching circuit similar to the aforesaid switching circuit for connection in parallel therewith, a second capacitor circuit similar to the aforesaid capacitor circuit and connected in parallel with the second switching circuit, a second diode circuit similar to the aforesaid diode circuit and connected in parallel with the second switching circuit, means for electrically connecting together the inductor tapping of the second switching circuit, a common connection between the capacitors of the second capacitor circuit and a common connection between the diodes of the second diode circuit, output circuit connections for enabling the load circuit to be connected electrically between the inductor tappings of the two switching circuits, and a second control means responsive to the aforesaid control signal for rendering the switching devices of the second switching circuit repeatedly and alternately conductive at instants in each cycle of operation which are variable in dependence upon the control signal in a sense opposite to that in which the control means associated with the first switching circuit varies the instants at which the switching devices of the first switching circuit are rendered conductive.

8. An electric circuit arrangement according to claim 7, wherein the inductor tapping is a centre tapping on the inductor, the two capacitors in each capacitor circuit have the same electrical characteristics, and the two diodes in each diode circuit have the same electrical characteristics.

9. An electric control system for a direct current electric motor including an electric circuit arrangement according to claim 8 for controlling the flow of current between a direct current supply source and a field circuit of the electric motor, the motor field circuit constituting the aforesaid direct current load circuit.

10. An electric circuit arrangement according to claim 8, for controlling the flow of current between a direct current supply source and a direct current load circuit which has a relatively low inductance, including in the said output circuit connections an inductor having a desired relatively high inductance for raising to a predetermned value the total inductance of the output circuit connections and direct current load circuit.

11. An electric control system for a direct current electric motor including an electric circuit arrangement according to claim 10 for controlling the flow of current between a direct current supply source and an armature circuit of the motor, the motor armature circuit constituting the aforesaid direct current load circuit.

12. An electric circuit arrangement according to claim 7 wherein the controllable electronic switching devices comprise silicon controlled rectifier devices, and each control means comprises a pulse generating means.

References Cited by the Examiner
UNITED STATES PATENTS
3,150,307    9/1964    Kaeding _____ 318—345

OTHER REFERENCES

Publications: GE SCR Manual, 2nd Ed., Auburn, N.Y., 1961, pages 73–75.

JOHN F. COUCH, *Primary Examiner.*

ORIS L. RADER, *Examiner.*

S. GORDON, *Assistant Examiner.*